(12) United States Patent
Ide et al.

(10) Patent No.: US 11,333,889 B2
(45) Date of Patent: May 17, 2022

(54) DISPLAY DEVICE

(71) Applicant: SEIKO EPSON CORPORATION, Tokyo (JP)

(72) Inventors: Mitsutaka Ide, Shiojiri (JP); Masatoshi Yonekubo, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 161 days.

(21) Appl. No.: 16/669,587

(22) Filed: Oct. 31, 2019

(65) Prior Publication Data
US 2020/0142194 A1 May 7, 2020

(30) Foreign Application Priority Data
Nov. 1, 2018 (JP) .............................. JP2018-206385

(51) Int. Cl.
*G02B 27/01* (2006.01)
*G06F 1/16* (2006.01)

(52) U.S. Cl.
CPC ......... *G02B 27/0172* (2013.01); *G06F 1/163* (2013.01); *G02B 2027/011* (2013.01); *G02B 2027/0174* (2013.01); *G02B 2027/0178* (2013.01)

(58) Field of Classification Search
CPC ........ G02B 27/0172; G02B 2027/0174; G02B 2027/011; G02B 2027/0178; G02B 2027/0116; G02B 2027/0134; G02B 17/0836; G02B 17/086; G02B 27/0037; G02B 27/4211; G02B 27/4277; G02B 5/18; G02B 5/1847; G02B 5/188; G02B 2005/1804; G06F 1/163

USPC .......................................................... 359/567
See application file for complete search history.

(56) References Cited

U.S. PATENT DOCUMENTS

| | | | | |
|---|---|---|---|---|
| 4,927,234 A | * | 5/1990 | Banbury | G02B 27/0101 345/9 |
| 6,788,442 B1 | * | 9/2004 | Potin | G02B 27/0172 345/8 |
| 2002/0039232 A1 | | 4/2002 | Takeyama | |
| 2009/0141324 A1 | | 6/2009 | Mukawa | |

(Continued)

FOREIGN PATENT DOCUMENTS

| | | | | |
|---|---|---|---|---|
| GB | 2163869 A | * | 3/1986 | ......... G02B 27/0101 |
| JP | 2002-139695 A | | 5/2002 | |

(Continued)

*Primary Examiner* — Thomas K Pham
*Assistant Examiner* — Henry A Duong
(74) *Attorney, Agent, or Firm* — Oliff PLC

(57) ABSTRACT

A display device of the present disclosure includes, along an optical path of image light emitted from an image light generating device, a first optical unit having positive power, a second optical unit that includes a first diffraction element and has positive power, a third optical unit having positive power, and a fourth optical unit that includes a second diffraction element and has positive power. A first diffraction angle of the image light at the first diffraction element is different from a second diffraction angle of the image light at the second diffraction element. A correction optical system that corrects an incident angle of the image light with respect to the second diffraction element is provided between the first optical unit and the fourth optical unit on the optical path.

10 Claims, 11 Drawing Sheets

(56) References Cited

U.S. PATENT DOCUMENTS

2017/0261751 A1    9/2017  Noguchi et al.
2018/0151194 A1    5/2018  Noguchi

FOREIGN PATENT DOCUMENTS

| JP | 2009-133998 A | 6/2009 |
| JP | 2017-167181 A | 9/2017 |
| JP | 2018-087949 A | 6/2018 |

* cited by examiner

DISPLAY DEVICE

The present application is based on, and claims priority from JP Application Serial Number 2018-206385, filed on Nov. 1, 2018, the disclosure of which is hereby incorporated by reference herein in its entirety.

BACKGROUND

1. Technical Field

The present disclosure relates to a display device that displays an image by using a diffraction element.

2. Related Art

As a display device using a diffraction element such as a holographic element, a display device in which a diffraction element deflects image light emitted from an image light generating device toward an eye of an observer is conceivable. Interference fringes are optimized in the diffraction element to obtain an optimum diffraction angle and optimum diffraction efficiency at a specific wavelength. However, the image light has a predetermined spectral width with a specific wavelength as the center. Thus, light having a peripheral wavelength deviated from the specific wavelength may cause a decrease in resolution of an image. For this reason, a display device in which a first diffraction element of a reflection type emits image light emitted from an image light generating device toward a second diffraction element disposed in front, and the second diffraction element deflects the image light emitted from the first diffraction element toward an eye of an observer is conceivable. According to the configuration, the first diffraction element can compensate for light having a peripheral wavelength and cancel a color aberration, and a decrease in resolution of an image due to the light having the peripheral wavelength deviated from a specific wavelength can be suppressed (for example, see JP-A-2017-167181).

When wavelength compensation is performed by using two diffraction elements as disclosed in JP-A-2017-167181, it is conceivable that the two diffraction elements have an optical conjugated relationship. When the two diffraction elements have a conjugated relationship, diffraction angles of the two diffraction elements need to be the same. However, when the diffraction angles of the two diffraction elements are set to be the same, a display device itself may become larger. Thus, it is conceivable that the conjugated relationship is eliminated without setting the diffraction angles of the two diffraction elements to be the same. However, in this case, a problem of a decrease in image quality due to insufficient wavelength compensation occurs.

SUMMARY

In order to solve the above-described problem, a display device according to one aspect of the present disclosure includes, along an optical path of image light emitted from an image light generating device, a first optical unit having positive power, a second optical unit that includes a first diffraction element and has positive power, a third optical unit having positive power, and a fourth optical unit that includes a second diffraction element and has positive power, where a first diffraction angle of the image light at the first diffraction element is different from a second diffraction angle of the image light at the second diffraction element, and a correction optical system that corrects an incident angle of the image light with respect to the second diffraction element is provided between the first optical unit and the fourth optical unit on the optical path.

In the display device according to the above-described aspect, the second diffraction angle may be greater than the first diffraction angle.

In the display device according to the above-described aspect, the correction optical system may be located on the third optical unit side of the second optical unit on the optical path.

In the display device according to the above-described aspect, the correction optical system may deflect the image light dispersed by the first diffraction element.

In the display device according to the above-described aspect, the correction optical system may be located on the first optical unit side of the second optical unit on the optical path.

In the display device according to the above-described aspect, the correction optical system may change an incident angle of the image light with respect to the first diffraction element.

In the display device according to the above-described aspect, the correction optical system may change an incident position of the image light with respect to the first diffraction element.

In the display device according to the above-described aspect, the correction optical system may include a prism.

DESCRIPTION OF EXEMPLARY EMBODIMENTS

First Exemplary Embodiment

Exemplary embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
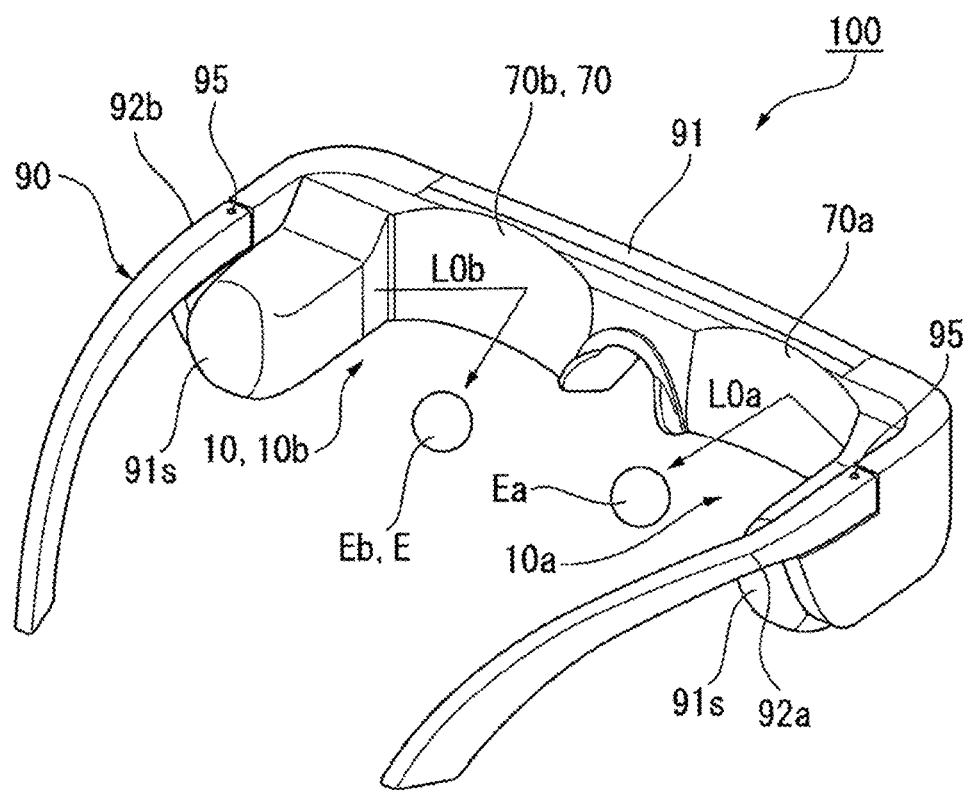
FIG. 1 is an external view of a display device according to a first exemplary embodiment.
Figure 2:
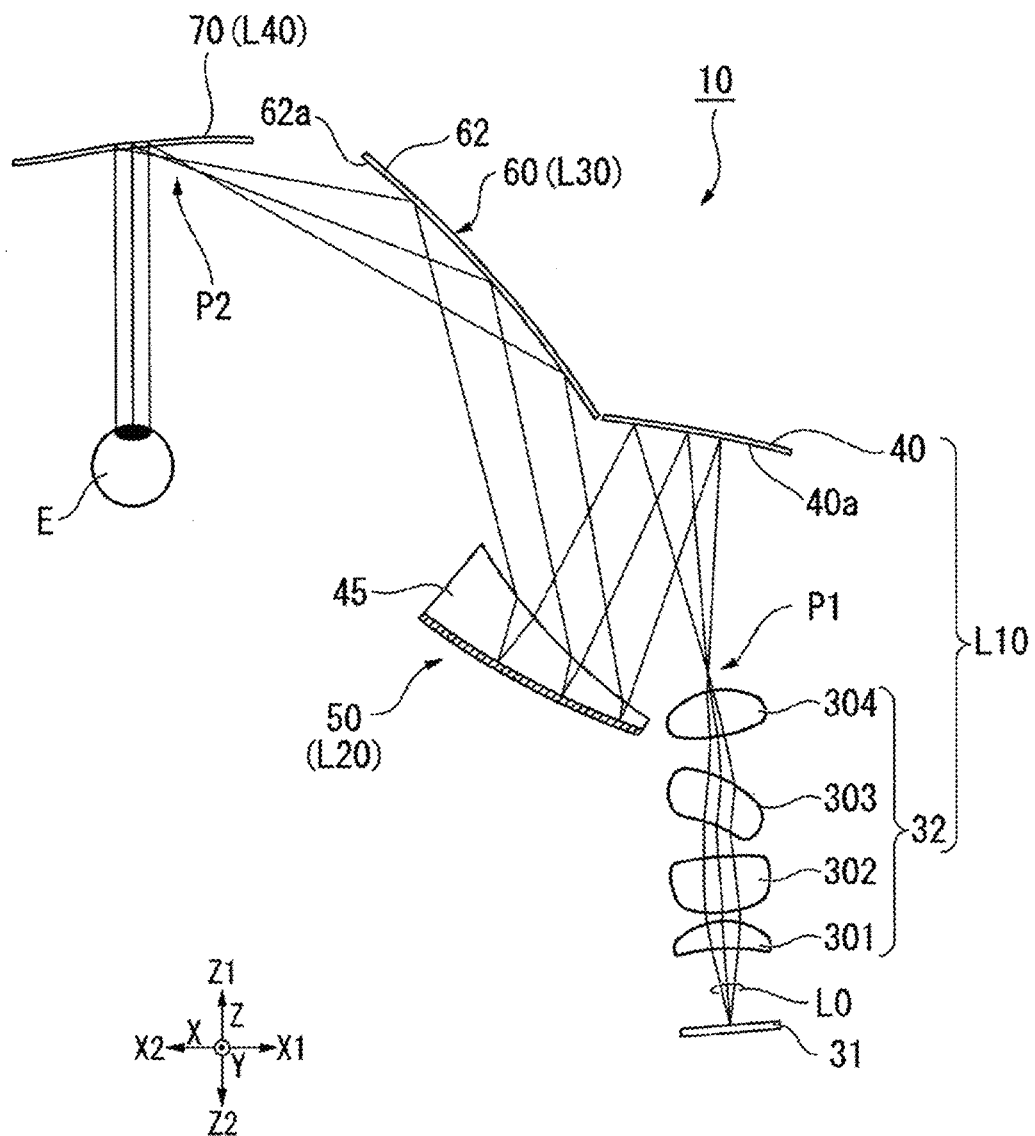
FIG. 2 is a schematic diagram of an optical system of the display device.

FIG. 1 is an external view illustrating one aspect of an external appearance of a display device 100 according to a present exemplary embodiment. FIG. 2 is a schematic diagram illustrating one aspect of an optical system 10 of the display device 100 illustrated in FIG. 1. Note that, as necessary in the drawings used in the following description, a front-rear direction of an observer wearing the display device is a direction along a Z axis, the front of the observer wearing the display device is a front side Z1 as one side in the front-rear direction, and the rear of the observer wearing the display device is a rear side Z2 as the other side in the front-rear direction. In addition, a left-and-right direction of the observer wearing the display device is a direction along an X axis, the right of the observer wearing the display device is a right side X1 as one side in the left-and-right direction, and the left of the observer wearing the display device is a left side X2 as the other side in the left-and-right direction. Further, an up-and-down direction of the observer wearing the display device is a direction along a Y axis direction, an upper side of the observer wearing the display device is an upper side Y1 as one side in the up-and-down direction, and a lower side of the observer wearing the display device is a lower side Y2 as the other side in the up-and-down direction.

The display device 100 illustrated in FIG. 1 is a head-mounted display device, and includes a right-eye optical system 10a that causes image light L0a to be incident on a right eye Ea and a left-eye optical system 10b that causes image light L0b to be incident on a left eye Eb. For example, the display device 100 is formed in a shape like glasses. Specifically, the display device 100 further includes a housing 90 that holds the right-eye optical system 10a and the left-eye optical system 10b. The display device 100 is mounted on a head of an observer by the housing 90.

The display device 100 includes, as the housing 90, a frame 91, a temple 92a that is provided on the right side of the frame 91 and engages with a right ear of the observer, and a temple 92b that is provided on the left side of the frame 91 and engages with a left ear of the observer. The frame 91 has a storage space 91s in both side portions, and each part of an image light projecting device or the like constituting an optical system 10 described below is housed inside the storage space 91s. The temples 92a and 92b are foldably coupled to the frame 91 by a hinge 95.

The right-eye optical system 10a and the left-eye optical system 10b have the same basic configuration. Therefore, the right-eye optical system 10a and the left-eye optical system 10b will be described as the optical system 10 without distinction in the description below.

Next, a basic configuration of the optical system 10 of the display device 100 will be described with reference to FIG. 2.

As illustrated in FIG. 2, in the optical system 10 in the present exemplary embodiment, a first optical unit L10 having positive power, a second optical unit L20 having positive power, a third optical unit L30 having positive power, and a fourth optical unit L40 having positive power are disposed along an optical path of image light L0 emitted from an image light generating device 31.

In the present exemplary embodiment, the first optical unit L10 having positive power is constituted of a mirror 40 and a projection optical system 32. The second optical unit L20 having positive power is constituted of a first diffraction element 50 of a reflection type. The third optical unit L30 having positive power is constituted of a light-guiding system 60. The fourth optical unit L40 having positive power is constituted of a second diffraction element 70 of a reflection type. In the present exemplary embodiment, the first diffraction element 50 and the second diffraction element 70 are reflection-type diffraction elements.

In the optical system 10, with reference to a traveling direction of the image light L0, the image light generating device 31 emits the image light L0 toward the projection optical system 32, and the projection optical system 32 emits the incident image light L0 toward the mirror 40. The mirror 40 includes a reflection surface 40a, and reflects the image light L0 toward the first diffraction element 50. The image light L0 reflected by the reflection surface 40a of the mirror 40 passes through a correction optical system 45 and is incident on the first diffraction element 50. The image light L0 diffracted by the first diffraction element 50 is emitted toward the light-guiding system 60. The light-guiding system 60 emits the incident image light L0 to the second diffraction element 70, and the second diffraction element 70 emits the incident image light L0 toward an eye E of the observer.

In the present exemplary embodiment, the image light generating device 31 generates the image light L0.

An aspect may be adopted where the image light generating device 31 includes a display panel 310 such as an organic electroluminescent display element. The aspect can provide a small-sized display device 100 capable of displaying a high-quality image. Another aspect may be adopted where the image light generating device 31 includes an illumination light source (not illustrated) and a display panel 310 such as a liquid crystal display element that modulates illumination light emitted from the illumination light source. The aspect allows the illumination light source to be selected. Thus, the aspect has an advantage of increasing a degree of flexibility in a wavelength characteristic of the image light L0. Herein, an aspect may be adopted where the image light generating device 31 includes one display panel 310 that enables color display. Another aspect may be adopted where the image light generating device 31 includes a plurality of display panels 310 corresponding to respective colors and a synthesis optical system that synthesizes image light in respective colors emitted from the plurality of display panels 310. Furthermore, an aspect may be adopted where the image light generating device 31 modulates laser light by a micromirror device. In this case, image light is generated by scanning the laser light by driving the micromirror device.

The projection optical system 32 is an optical system that projects the image light L0 generated by the image light generating device 31, and is constituted of a first lens 301, a second lens 302, a third lens 303, and a fourth lens 304.

The first lens 301, the second lens 302, the third lens 303, and the fourth lens 304 are constituted of a free-form lens or a rotationally symmetrical lens. Further, the projection optical system 32 may be an eccentric optical system. In FIG. 2, an example is given of a case in which the number of lenses in the projection optical system 32 is four, but the number of lenses is not limited thereto. The projection optical system 32 may include five or more lenses. Further, each of the lenses may be bonded together to constitute the projection optical system 32.

The light-guiding system 60 is constituted of a mirror 62 having a reflection surface 62a with a center being recessed with respect to a peripheral portion, and has positive power. The mirror 62 includes the reflection surface 62a inclined diagonally toward the front-rear direction. Note that the reflection surface 62a is a spherical surface, an aspherical surface, or a free form surface. In the present exemplary embodiment, the mirror 62 is a total reflection mirror having the reflection surface 62a formed from a free-form surface. However, the mirror 62 may be a half mirror, and in this case, a range in which external light is visually recognizable can be widened.

Next, a configuration of the first diffraction element 50 and the second diffraction element 70 will be described.

In the present exemplary embodiment, the first diffraction element 50 and the second diffraction element 70 have the same basic configuration. Hereinafter, a configuration of the second diffraction element 70 will be described as an example.

Figure 3A:
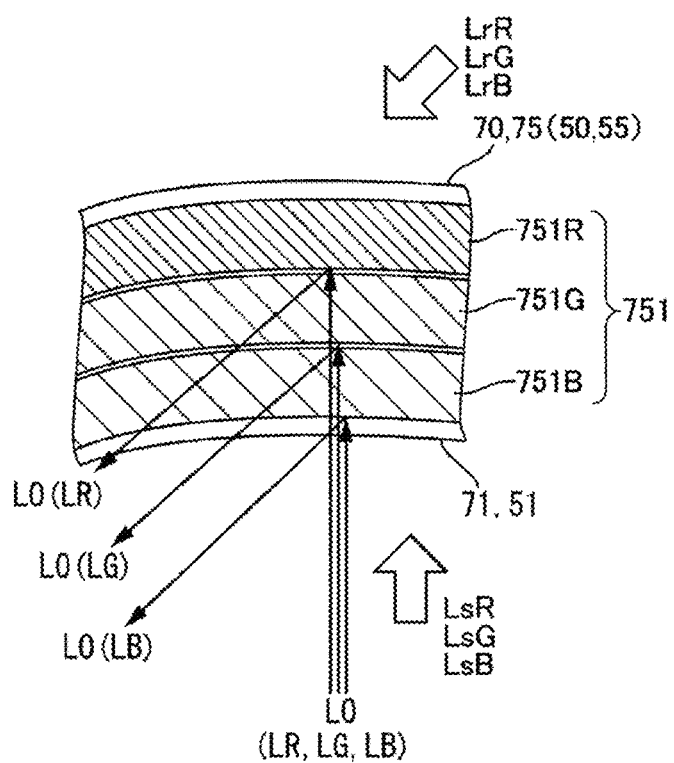
FIG. 3A is a schematic diagram of interference fringes of a diffraction element.

FIG. 3A is a schematic diagram of interference fringes 751 of the second diffraction element 70 illustrated in FIG. 2. As illustrated in FIG. 3A, the second diffraction element 70 includes a reflection-type volume holographic element 75 that is a partial reflection-type diffraction optical element. Thus, the second diffraction element 70 constitutes a partial transmissive reflective combiner. Therefore, external light is also incident on the eye E via the second diffraction element 70, and thus the observer can recognize an image in which the image light L0 formed by the image light generating device 31 and the external light (background) are superimposed on each other.

The second diffraction element 70 faces the eye E of the observer. An incident surface 71 of the second diffraction element 70 on which the image light L0 is incident has a concave surface being recessed in a direction away from the eye E. In other words, the incident surface 71 has a shape having a central portion recessed and curved with respect to a peripheral portion in the incident direction of the image light L0. Thus, the image light L0 can be efficiently condensed toward the eye E of the observer.

The second diffraction element 70 includes the interference fringes 751 having a pitch corresponding to a specific wavelength. The interference fringes 751 are recorded as a difference in refractive index and the like in a hologram photosensitive layer. The interference fringes 751 are inclined in one direction with respect to the incident surface 71 of the second diffraction element 70 so as to correspond to a specific incident angle. Therefore, the second diffraction element 70 diffracts and then deflects the image light L0 in a predetermined direction. The specific wavelength and the specific incident angle respectively correspond to a wavelength and an incident angle of the image light L0. The interference fringes 751 having the configuration can be formed by performing interference exposure on the holographic photosensitive layer by using reference light Lr and object light Ls.

In the present exemplary embodiment, the image light L0 is used for color display, and thus includes red light LR, green light LG, and blue light LB, which will be described below. Thus, the second diffraction element 70 includes interference fringes 751R, 751G, and 751B formed at a pitch corresponding to a specific wavelength. For example, the interference fringes 751R are formed at a pitch corresponding to the red light LR having a wavelength of 615 nm, for example, in a wavelength range from 580 nm to 700 nm. The interference fringes 751G are formed at a pitch corresponding to the green light LG having a wavelength of 535 nm, for example, in a wavelength range from 500 nm to 580 nm. The interference fringes 751B are formed at a pitch corresponding to the blue light LB having a wavelength of 460 nm, for example, in a wavelength range from 400 nm to 500 nm. The configuration can be formed by forming a holographic photosensitive layer having sensitivity corresponding to the respective wavelengths, and performing interference exposure on the holographic photosensitive layer by using reference light LrR, LrG, and LrB and object light LsR, LsG, and LsB having the respective wavelengths.

Figure 3B:
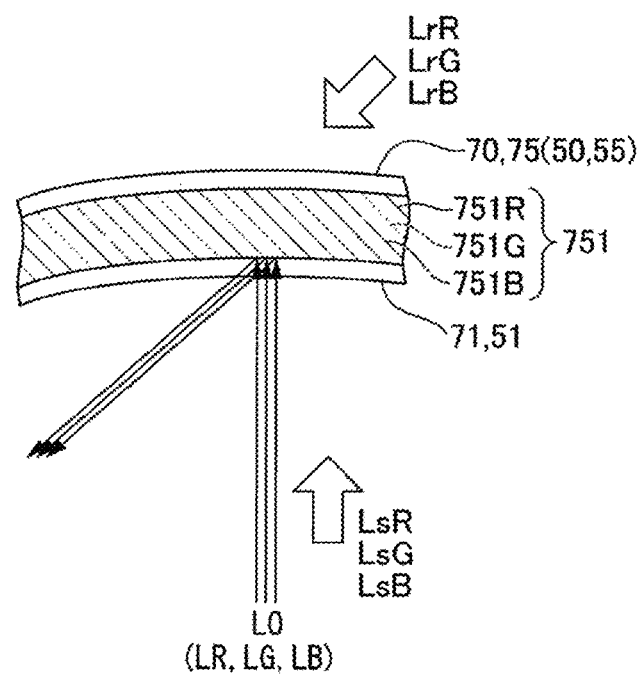
FIG. 3B is a schematic diagram of a different embodiment of interference fringes of a diffraction element.

Note that, as illustrated in FIG. 3B, the interference fringes 751 in which the interference fringes 751R, 751G, and 751B are superimposed on each other in one layer may be formed by dispersing a photosensitive material having sensitivity corresponding to the respective wavelengths in the holographic photosensitive layer, and then performing interference exposure on the holographic photosensitive layer by using the reference light LrR, LrG, and LrB and the object light LsR, LsG, and LsB having the respective wavelengths. Further, light having a spherical wave may be used as the reference light LrR, LrG, and LrB and the object light LsR, LsG, and LsB.

The first diffraction element 50 having the same basic configuration as the second diffraction element 70 includes a reflection-type volume holographic element 55. An incident surface 51 of the first diffraction element 50 on which the image light L0 is incident has a concave surface being recessed. In other words, the incident surface 51 has a shape having a central portion recessed and curved with respect to a peripheral portion in the incident direction of the image light L0. Thus, the image light L0 can be efficiently deflected toward the light-guiding system 60.

Figure 4:
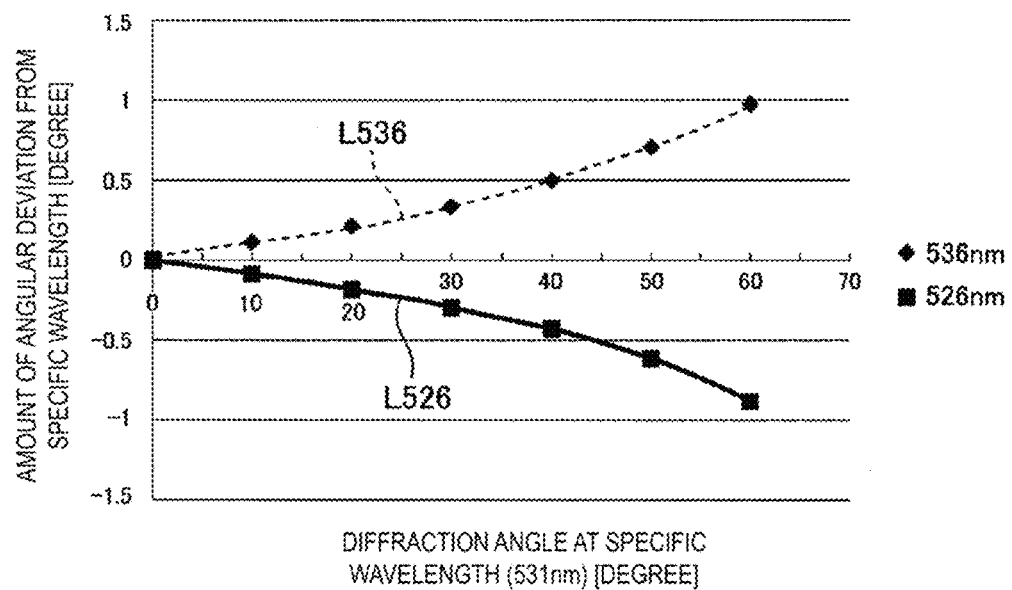
FIG. 4 is a schematic diagram of a diffraction characteristic in a volume hologram.

FIG. 4 is a diagram illustrating a diffraction characteristic in a volume hologram constituting the first diffraction element 50 and the second diffraction element 70. FIG. 4 illustrates a difference in diffraction angle between a specific wavelength and a peripheral wavelength when a light beam is incident on one point on the volume hologram. In FIG. 4, when assuming that the specific wavelength is 531 nm, a deviation in diffraction angle of light at a peripheral wavelength of 526 nm is indicated by a solid line L526, and a deviation in diffraction angle of light at a peripheral wavelength of 536 nm is indicated by a dashed line L536. As illustrated in FIG. 4, even when a light beam is incident on the same interference fringes recorded in the hologram, a light beam having a longer wavelength diffracts more greatly, and a light beam having a shorter wavelength is less likely to diffract. Thus, when two diffraction elements, namely, the first diffraction element 50 and the second diffraction element 70 are used as in the present exemplary embodiment, wavelength compensation cannot be appropriately performed unless light having a long wavelength and light having a short wavelength are caused to be incident in consideration of respective light beam angles with respect to a specific wavelength. In other words, a color aberration generated by the second diffraction element 70 cannot be canceled.

In the optical system 10 illustrated in FIG. 2, as described in JP-A-2017-167181, wavelength compensation, namely, a color aberration can be canceled because an incident direction and the like to the second diffraction element 70 is made appropriate in accordance with whether a sum of the number of times of formation of an intermediate image between the first diffraction element 50 and the second diffraction element 70 and the number of times of reflection by the mirror 62 is odd or even.

Figure 5:
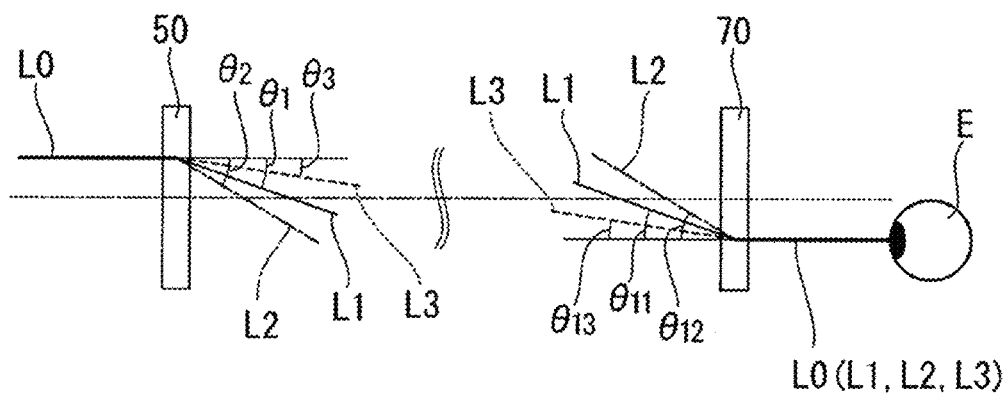
FIG. 5 is a schematic diagram of light emitted from a second diffraction element when diffraction angles are the same.

Here, a case in which diffraction angles of the first diffraction element 50 and the second diffraction element 70 are the same is considered. In other words, a case in which the diffraction angles of the first diffraction element 50 and the second diffraction element 70 are formed by the same diffraction element is considered. FIG. 5 is a schematic diagram of light emitted from the second diffraction element 70 when the diffraction angles of the first diffraction element 50 and the second diffraction element 70 are the same. Note that FIG. 5 also illustrates, in addition to light L1 (solid line) having a specific wavelength of the image light L0, light L2 (dot-and-dash line) on a long wavelength side and light L3 (dotted line) on a short wavelength side with respect to the specific wavelength.

As illustrated in FIG. 5, the image light L0 incident on the first diffraction element 50 is diffracted and deflected by the first diffraction element 50. At this time, in the first diffraction element 50 formed of the volume hologram as illustrated in FIG. 4, the light L2 on the long wavelength side with respect to the specific wavelength has a diffraction angle $\theta_2$ greater than a diffraction angle $\theta_1$ of the light L1 having the specific wavelength. Further, the light L3 on the short wavelength side with respect to the specific wavelength has a diffraction angle $\theta_3$ smaller than the diffraction angle $\theta_1$ of the light L1 having the specific wavelength. Therefore, the image light L0 emitted from the first diffraction element 50 is deflected and dispersed at each wavelength.

The image light L0 emitted from the first diffraction element 50 is incident on the second diffraction element 70 via the light-guiding system 60, and is then diffracted and deflected by the second diffraction element 70. At this time, on the optical path from the first diffraction element 50 to the second diffraction element 70, an intermediate image is formed once, and reflection by the mirror 62 is performed once. Therefore, when assuming that an angle between the image light L0 and a normal line of the incident surface of the second diffraction element 70 is an incident angle, the light L2 on the long wavelength side with respect to the specific wavelength has an incident angle $\theta_{12}$ greater than an incident angle $\theta_{11}$ of the light L1 having the specific wavelength while the light L3 on the short wavelength side with respect to the specific wavelength has an incident angle $\theta_{13}$ smaller than the incident angle $\theta_{11}$ of the light L1 having the specific wavelength. Further, as described above, the light L2 on the long wavelength side with respect to the specific wavelength has the diffraction angle $\theta_2$ greater than the diffraction angle $\theta_1$ of the light L1 having the specific wavelength. The light L3 on the short wavelength side with respect to the specific wavelength has the diffraction angle $\theta_3$ smaller than the diffraction angle $\theta_1$ of the light L1 having the specific wavelength.

Therefore, the light L2 on the long wavelength side with respect to the specific wavelength is incident on the first diffraction element 50 at the incident angle greater than the incident angle of the light L1 having the specific wavelength. However, the light L2 on the long wavelength side with respect to the specific wavelength has the diffraction angle greater than the diffraction angle of the light L1 having the specific wavelength. Thus, as a result, the light L2 on the long wavelength side with respect to the specific wavelength and the light L1 having the specific wavelength are substantially parallel light when being emitted from the second diffraction element 70. In contrast, the light L3 on the short wavelength side with respect to the specific wavelength is incident on the first diffraction element 50 at the incident angle smaller than the incident angle of the light L1 having the specific wavelength. However, the light L3 on the short wavelength side with respect to the specific wavelength has the diffraction angle smaller than the diffraction angle of the light L1 having the specific wavelength. Thus, as a result, the light L3 on the short wavelength side with respect to the specific wavelength and the light L1 having the specific wavelength are substantially parallel light when being emitted from the second diffraction element 70. In this way, as illustrated in FIG. 5, the image light L0 emitted from the second diffraction element 70 is incident as the substantially parallel light on the eye E of the observer. Thus, misalignment of image formation in a retina E0 at each wavelength can be suppressed, and a color aberration generated by the second diffraction element 70 can be canceled.

When the color aberration is canceled by setting the diffraction angles of the first diffraction element 50 and the second diffraction element 70 to be the same in this way, a conjugated relationship is established between the first diffraction element 50 and the second diffraction element 70. Here, the conjugated relationship refers to a relationship in which light emitted from a first position of the first diffraction element 50 is condensed by the light-guiding system 60 having positive power, and is incident on a second position corresponding to the first position of the second diffraction element 70.

However, when the conjugated relationship is established by setting the diffraction angles of the first diffraction element 50 and the second diffraction element 70 to be the same as described above, the following problem arises.

Figure 6A:
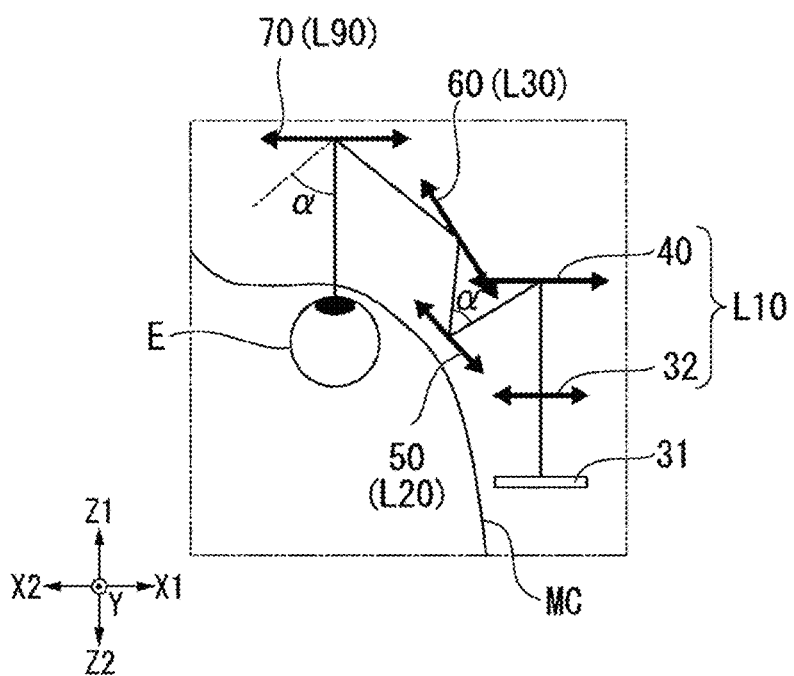
FIG. 6A is a schematic diagram when diffraction angles of a first diffraction element and the second diffraction element are set to a small angle.
Figure 6B:
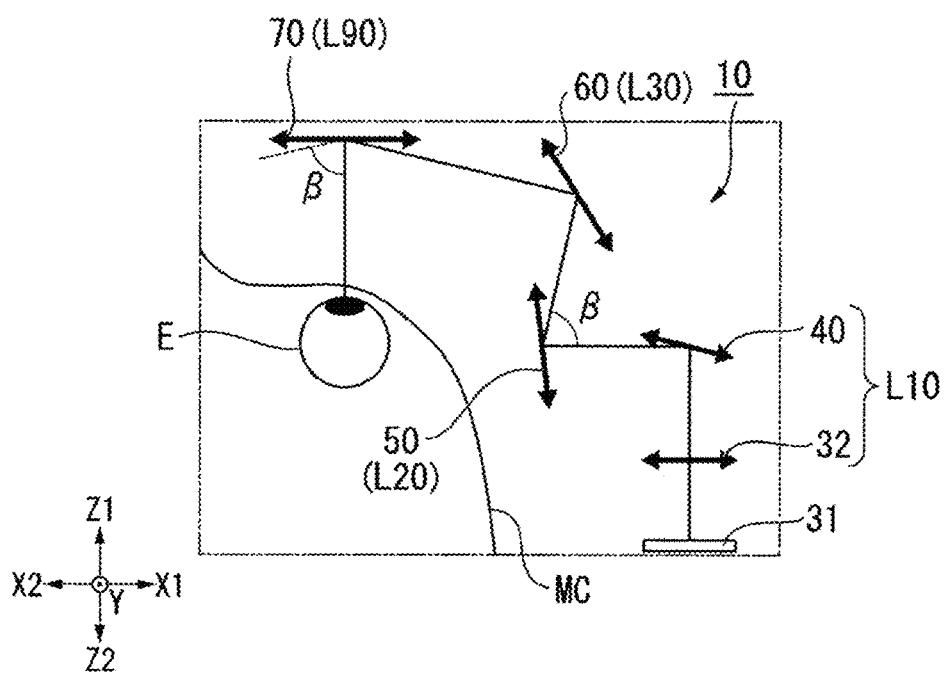
FIG. 6B is a schematic diagram when the diffraction angles of the first and second diffraction elements are set to a large angle.

FIG. 6A is a schematic diagram when the diffraction angles of the first diffraction element 50 and the second diffraction element 70 are set to a small angle. FIG. 6B is a schematic diagram when the diffraction angles of the first diffraction element 50 and the second diffraction element 70 are set to a large angle. Note that, in FIGS. 6A and 6B, each optical unit disposed along an optical axis is simplified and indicated by a thick arrow.

In FIG. 6A, the diffraction angles of the first diffraction element 50 and the second diffraction element 70 are set to a small angle $\alpha$. In FIG. 6B, the diffraction angles of the first diffraction element 50 and the second diffraction element 70 are set to an angle $\beta$ greater than the angle $\alpha$.

As illustrated in FIG. 6A, when the diffraction angles of the first diffraction element 50 and the second diffraction element 70 are set to the small angle $\alpha$, it is possible to reduce the size of the display device by disposing each optical member along a contour MC of a face of the observer. However, as illustrated in FIG. 6A, there is a problem in that the mirror 40 and the light-guiding system 60 interfere with each other and a part of the image light is missing.

On the other hand, as illustrated in FIG. 6B, when the diffraction angles of the first diffraction element 50 and the second diffraction element 70 are set to the large angle $\beta$, it is possible to avoid interference between the mirror 40 and the light-guiding system 60 by widening a gap therebetween. However, each optical member is disposed in a position away from the contour MC of the face of the observer, which results in a problem of increasing the size of the display device.

Figure 7:
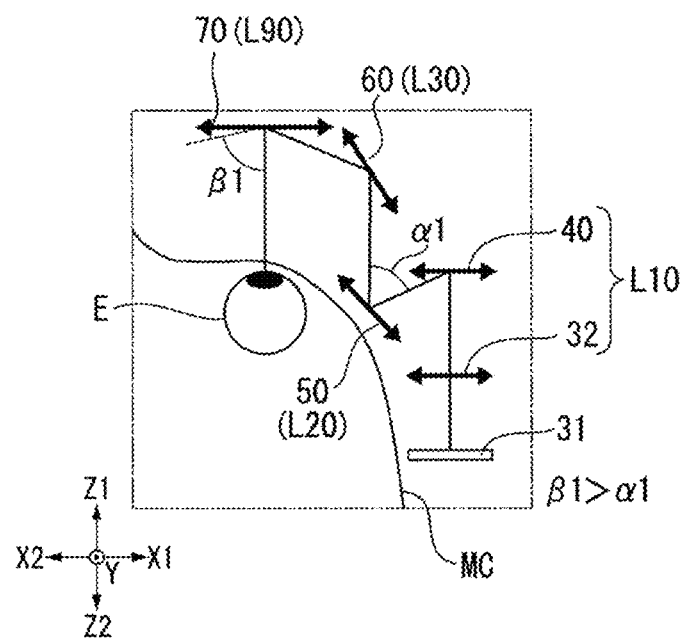
FIG. 7 is a diagram illustrating a relationship between the diffraction angles of the first diffraction element and the second diffraction element.

Thus, in the optical system 10 in the present exemplary embodiment, the first diffraction element 50 and the second diffraction element 70 have different diffraction angles. FIG. 7 is a diagram illustrating a relationship between the diffraction angles of the first diffraction element 50 and the second diffraction element 70 in the optical system 10 in the present exemplary embodiment.

As illustrated in FIG. 7, in the optical system 10 in the present exemplary embodiment, a first diffraction angle $\alpha 1$ of the image light L0 in the first diffraction element 50 and a second diffraction angle $\beta 1$ of the image light L0 in the second diffraction element 70 are different. Specifically, the second diffraction angle $\beta 1$ is greater than the first diffraction angle $\alpha 1$. According to the optical system 10 in the present exemplary embodiment, by setting the second diffraction angle $\beta 1$ to be greater than the first diffraction angle $\alpha 1$, the image light L0 is incident on the eye E of the observer at a large angle of view, and each optical unit can also be disposed along the contour MC of the face of the observer. Therefore, the size reduction of the display device itself including the optical system 10 can be achieved.

Thus, as described above, the size reduction of the display device can be achieved by setting the diffraction angles $\alpha 1$ and $\beta 1$ of the first diffraction element 50 and the second diffraction element 70 to be different from each other, but a new problem arises as described below.

Figure 8:
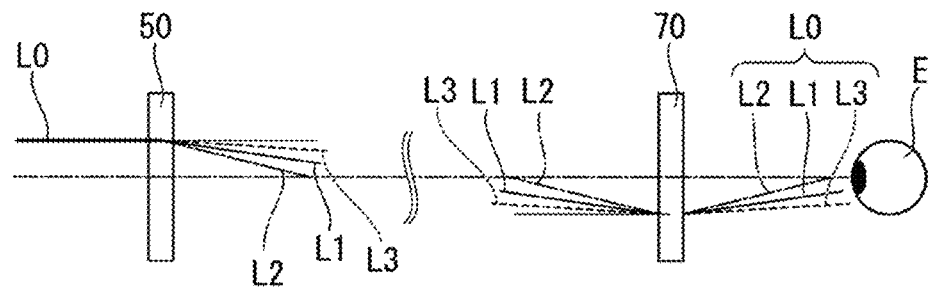
FIG. 8 is a schematic diagram of light emitted from the second diffraction element when the diffraction angles are different.

FIG. 8 is a schematic diagram of light emitted from the second diffraction element 70 when the diffraction angles of the first diffraction element 50 and the second diffraction element 70 are different. Note that it is assumed that the correction optical system 45 described below is not disposed on the optical path illustrated in FIG. 8. FIG. 8 also illustrates, in addition to the light L1 (solid line) having the specific wavelength of the image light L0, the light L2 (dot-and-dash line) on the long wavelength side with respect to the specific wavelength and the light L3 (dotted line) on the short wavelength side with respect to the specific wavelength.

As illustrated in FIG. 8, the image light L0 incident on the first diffraction element 50 is diffracted and then deflected by the first diffraction element 50. At this time, as illustrated in FIG. 8, the image light L0 emitted from the first diffraction element 50 is deflected and dispersed at each wavelength.

The image light L0 emitted from the first diffraction element 50 is diffracted and then deflected by the second diffraction element 70. At this time, since the diffraction angle of the second diffraction element 70 is different from the diffraction angle of the first diffraction element 50, the light L2 on the long wavelength side and the light L3 on the short wavelength side with respect to the light L1 having the specific wavelength are emitted in a widened state, as illustrated in FIG. 8. In this way, as illustrated in FIG. 8, the image light L0 emitted from the second diffraction element 70 is shifted in an image formation position in the retina E0 at each wavelength, and thus there is a problem in that a color aberration cannot be canceled, and a resolution of the image light L0 is reduced.

To resolve this problem, as illustrated in FIG. 2, the optical system 10 in the present exemplary embodiment includes, between the first optical unit L10 and the fourth optical unit L40 on the optical path of the image light L0, the correction optical system 45 that corrects an incident angle of the image light L0 with respect to the second diffraction element 70.

Next, three configuration examples conceivable as the correction optical system 45 will be described with reference to the drawings.

Figure 9A:
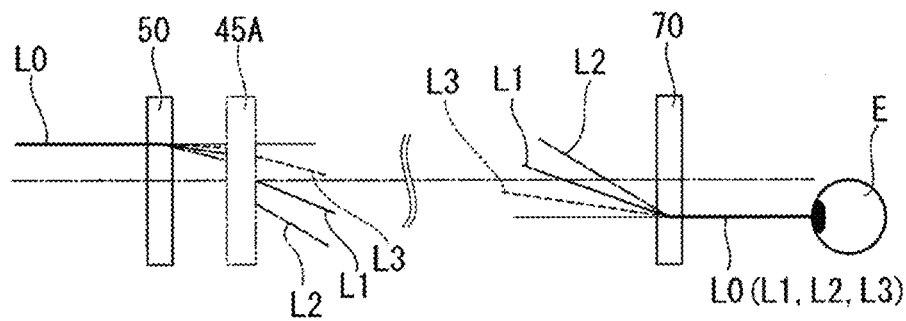
FIG. 9A is a schematic diagram of a first correction optical system.
Figure 9B:
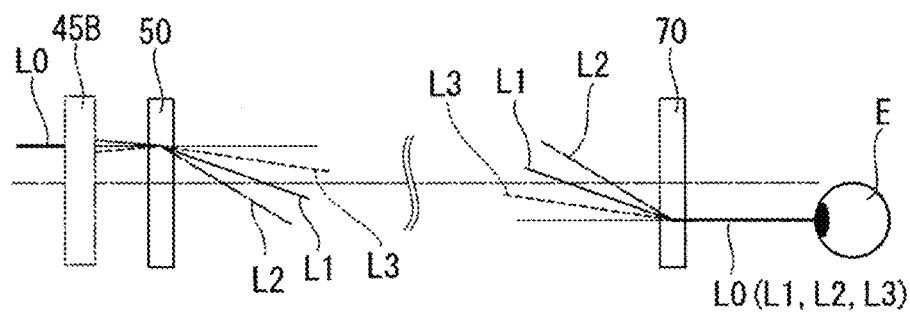
FIG. 9B is a schematic diagram of a second correction optical system.
Figure 9C:
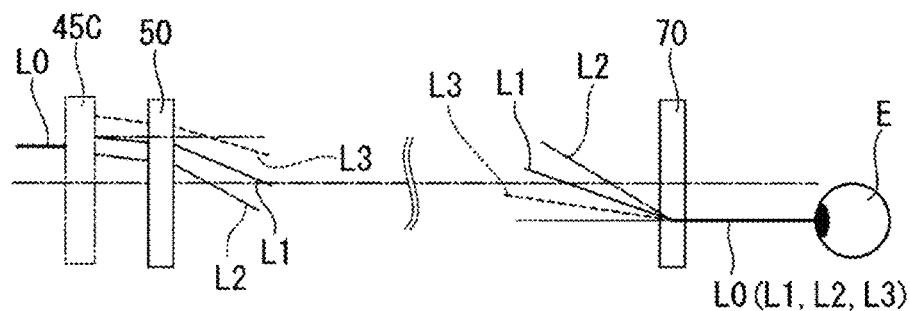
FIG. 9C is a schematic diagram of a third correction optical system.

FIG. 9A is a schematic diagram of a first correction optical system 45A. FIG. 9B is a schematic diagram of a second correction optical system 45B. FIG. 9C is a schematic diagram of a third correction optical system 45C.

Note that it is assumed in FIGS. 9A, 9B, and 9C that the second diffraction angle $\beta 1$ of the second diffraction element 70 is greater than the first diffraction angle $\alpha 1$ of the first diffraction element 50.

The first correction optical system 45A illustrated in FIG. 9A is provided between the first diffraction element 50 and the second diffraction element 70 on the optical path of the image light L0. The image light L0 emitted from the first diffraction element 50 is incident on the correction optical system 45 in a dispersed state at each wavelength. The first correction optical system 45A corrects an incident angle of the image light L0 dispersed at each wavelength with respect to the second diffraction element 70. Specifically, the first correction optical system 45 performs correction so as to compensate for a shortage of the diffraction angle of the image light L0 in the first diffraction element 50. In this way, the first correction optical system 45A can correct an emission angle of the image light L0 dispersed at each wavelength such that the light having the specific wavelength and the light having the peripheral wavelength are substantially parallel as illustrated in FIG. 5 when being emitted from the second diffraction element 70.

The second correction optical system 45B illustrated in FIG. 9B is provided on a light incident side of the first diffraction element 50, namely, on the first optical unit L10 side on the optical path of the image light L0. In this case, the second correction optical system 45B is provided between the first optical unit L10 and the second optical unit L20 (see FIG. 2). As illustrated in FIG. 9B, the second correction optical system 45B corrects an incident angle of the image light L0 with respect to the first diffraction element 50 at each wavelength, namely, for each of the light L1 having the specific wavelength, the light L2 on the long wavelength side, and the light L3 on the short wavelength side. The second correction optical system 45B corrects a diffraction angle of the first diffraction element 50 by, for example, previously angling the light L2 on the long wavelength side and the light L3 on the short wavelength side in the image light L0. In this way, the second correction optical system 45B can cause the image light L0 to be incident on the first diffraction element 50 such that the light having the specific wavelength and the light having the peripheral wavelength are substantially parallel as illustrated in FIG. 5 when being emitted from the second diffraction element 70.

The third correction optical system 45C illustrated in FIG. 9C is provided on a light incident side of the first diffraction element 50 on the optical path of the image light L0. In this case, the third correction optical system 45C is provided between the first optical unit L10 and the second optical unit L20 (see FIG. 2). As illustrated in FIG. 9C, the third correction optical system 45C appropriately corrects each of an incident position and an angle of the image light L0 incident on the first diffraction element 50. A diffraction angle of the volume hologram constituting the first diffraction element 50 varies from place to place. The third correction optical system 45C corrects, for example, an incident position of each of the light L1 having the specific wavelength in the image light L0, the light L2 on the long wavelength side, and the light L3 on the short wavelength side with respect to the first diffraction element 50 to an appropriate position. In this way, the third correction optical system 45C can correct an incident angle of the image light L0 emitted from the first diffraction element 50 with respect to the second diffraction element 70 such that the light having the specific wavelength and the light having the peripheral wavelength are substantially parallel as illustrated in FIG. 5 when being emitted from the second diffraction element 70.

By using any of the correction optical systems 45A to 45C illustrated in FIGS. 9A, 9B, and 9C, the image light L0 emitted from the second diffraction element 70 can be incident on the eye E of the observer as substantially parallel light. Thus, misalignment of image formation in the retina E0 at each wavelength can be suppressed, and a color aberration generated by the second diffraction element 70 can be canceled. Therefore, by adopting any of the correction optical systems 45A to 45C described above as the correction optical system 45 in the present exemplary embodiment, high image quality can be acquired by canceling a color aberration generated by the second diffraction element 70 while adopting a structure in which the diffraction angles of the first diffraction element 50 and the second diffraction element 70 are different. In other words, the size reduction of the display device 100 can be achieved by setting diffraction angles to be different while appropriately performing wavelength compensation by the two diffraction elements.

As the correction optical systems 45A to 45C described above, a correction optical system may have power capable of deflecting the image light L0 as illustrated in FIGS. 9A, 9B, and 9C, and, for example, a mirror, a lens, a prism, or the like having a free-form surface can be used. Particularly by using the prism, an incident angle of the image light L0 with respect to the second diffraction element 70 can be more easily corrected by using dispersion of light. Note that the prism may be a wedge prism having a wedge.

Specifically, in the optical system 10 in the present exemplary embodiment, a prism 45a is used as the correction optical system 45. The prism 45a has all the functions of each of the correction optical systems 45A to 45C illustrated in FIGS. 9A to 9C as described below.

In the present exemplary embodiment, the prism 45a is integrally provided with the first diffraction element 50 constituting the second optical unit L20. The prism 45a functions as a support member that supports the first diffraction element 50. In the present exemplary embodiment, the prism 45a includes a light incident/emission surface 45a1 on which the image light L0 is incident or from which the image light L0 is emitted. The prism 45a has a shape in which a thickness on the side closer to the eye E of the observer is thick and a thickness on the side away from the eye E of the observer is thin. Further, it can also be said that the prism 45a has a shape in which a thickness on the side closer to the second diffraction element 70 located on the left side X2 with respect to the first diffraction element 50 is thick, and a thickness on the side closer to the image light generating device 31 located on the right side X1 with respect to the first diffraction element 50 is thin.

The light incident/emission surface 45a1 is constituted of a surface being inclined so as to protrude toward the front side Z1 as it is closer to the eye E of the observer. Further, it can also be said that the light incident/emission surface 45a1 is constituted of a surface being inclined so as to protrude toward the front side Z1 as it is closer to the second diffraction element 70.

Figure 10:
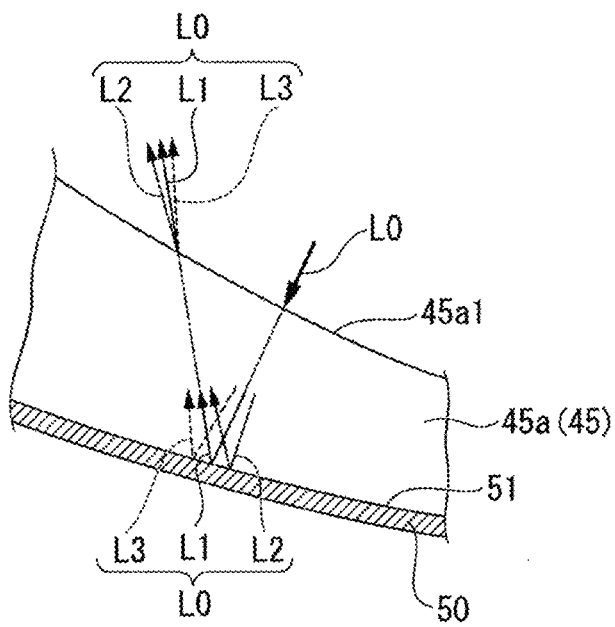
FIG. 10 is an enlarged diagram of a prism.

FIG. 10 is an enlarged diagram of the prism 45a. FIG. 10 also illustrates, in addition to the light L1 (solid line) having the specific wavelength of the image light L0, the light L2 (dot-and-dash line) on the long wavelength side with respect to the specific wavelength and the light L3 (dotted line) on the short wavelength side with respect to the specific wavelength.

As illustrated in FIG. 10, the image light L0 is incident on the prism 45a from the light incident/emission surface 45a1. At this time, when the image light L0 is incident on the prism 45a due to dispersion of the light, the light L3 on the short wavelength side is refracted the most, a refractive index of the light L2 on the long wavelength side is the smallest, and the light L1 having the specific wavelength is refracted by the magnitude between the light L3 on the short wavelength side and the light L2 on the long wavelength side. Then, the light L1 having the specific wavelength, the light L2 on the long wavelength side, and the light L3 on the short wavelength side are transmitted through the prism 45a and are incident on the first diffraction element 50. The light L1 having the specific wavelength, the light L2 on the long wavelength side, and the light L3 on the short wavelength side are dispersed by the prism 45a and are thus incident on different places of the first diffraction element 50. Further, incident angles of the light L1 having the specific wavelength, the light L2 on the long wavelength side, and the light L3 on the short wavelength side with respect to the first diffraction element 50 are different from each other.

In this way, by dispersing the image light L0, the prism 45a can change the incident positions of the light L1 having the specific wavelength, the light L2 on the long wavelength side, and the light L3 on the short wavelength side with respect to the first diffraction element 50. The prism 45a is located on the first optical unit L10 side of the first diffraction element 50 (second optical unit L20) on the optical path of the image light L0 (see FIG. 2). In other words, it can be said that the prism 45a has the function of "performing correction so as to change an incident position of the image light L0 incident on the first diffraction element 50 for each wavelength" in the third correction optical system 45C illustrated in FIG. 9C.

As described above, by dispersing the image light L0, the prism 45a can change incident angles of the light L1 having the specific wavelength, the light L2 on the long wavelength side, and the light L3 on the short wavelength side with respect to the first diffraction element 50. The prism 45a is located on the first optical unit L10 side of the first diffraction element 50 (second optical unit L20) on the optical path of the image light L0 (see FIG. 2). In other words, it can be said that the prism 45a has the function of "performing correction so as to change an incident angle of the image light L0 with respect to the first diffraction element 50" in the second correction optical system 45B illustrated in FIG. 9B.

As illustrated in FIG. 10, since a diffraction angle at the first diffraction element 50 varies depending on a place, the light L1 having the specific wavelength, the light L2 on the long wavelength side, and the light L3 on the short wavelength side are diffracted at different angles. The light L1 having the specific wavelength, the light L2 on the long wavelength side, and the light L3 on the short wavelength side that are diffracted by the first diffraction element 50 are transmitted through the prism 45a again and emitted from the light incident/emission surface 45a1. The light L1 having the specific wavelength, the light L2 on the long wavelength side, and the light L3 on the short wavelength side are emitted from the prism 45a in different directions.

In this way, the prism 45a deflects the image light L0 in a different direction for each wavelength, and thus incident angles of the light L1 having the specific wavelength, the light L2 on the long wavelength side, and the light L3 on the short wavelength side with respect to the second diffraction element 70 can be each adjusted. The prism 45a is located on the third optical unit L30 side of the first diffraction element 50 (second optical unit L20) on the optical path of the image light L0 (see FIG. 2). In other words, it can be said that the prism 45a has the function of "performing correction so as to compensate for a shortage of a diffraction angle of the image light L0 at the first diffraction element 50" in the first correction optical system 45A illustrated in FIG. 9A.

As described above, the optical system 10 in the present exemplary embodiment can acquire the functions acquired by combining all of the correction optical systems 45A to 45C illustrated in FIGS. 9A, 9B, and 9C by using the prism 45a as the correction optical system 45. Thus, the optical system 10 in the present exemplary embodiment can accurately correct an incident angle of the image light L0 with respect to the second diffraction element 70 by using the prism 45a.

Therefore, even when the first diffraction element 50 and the second diffraction element 70 having different diffraction angles are used, the optical system 10 in the present exemplary embodiment can cause the image light L0 emitted from the second diffraction element 70 to be incident on the eye E of the observer as substantially parallel light by the correction optical system 45. Thus, misalignment of image formation in the retina E0 at each wavelength can be suppressed, and a color aberration generated by the second diffraction element 70 can be canceled. For this reason, degradation of a resolution of the image light can be suppressed.

In other words, the optical system 10 in the present exemplary embodiment can acquire high image quality by canceling a color aberration generated by the second diffraction element 70 while adopting a structure in which the diffraction angles of the first diffraction element 50 and the second diffraction element 70 are different. In other words, the optical system 10 in the present exemplary embodiment can achieve the size reduction of the display device 100 by setting different diffraction angles while appropriately performing wavelength compensation by the two diffraction elements.

Figure 11:
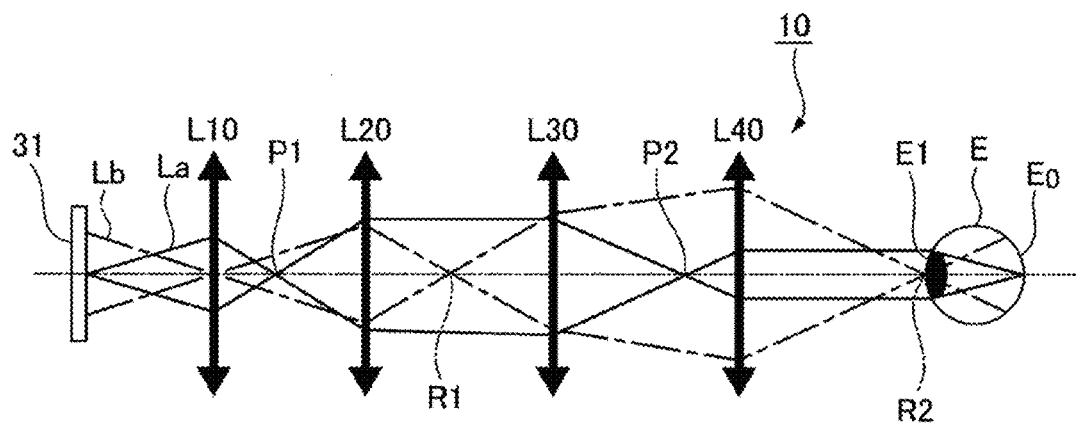
FIG. 11 is a diagram schematically illustrating a light beam diagram of an optical system.

FIG. 11 is a diagram schematically illustrating a light beam diagram of the optical system 10 in the present exemplary embodiment. In FIG. 11, each optical unit disposed along the optical axis is indicated by a thick arrow. Further, in FIG. 11, a light beam of the image light emitted from the center of the image light generating device 31 is indicated by a solid line La, and a main light beam of the image light emitted from an end portion of the image light generating device 31 is indicated by a dot-and-dash line Lb. Further, FIG. 11 illustrates travel of light emitted from the image light generating device 31. Note that FIG. 11 illustrates all optical units in a perspective view in order to simplify the diagram. In the following description, an "intermediate image" is a location where the light beam (solid line La) emitted from one pixel converges, and a "pupil" is a location where the main light beam (dot-and-dash line Lb) at each angle of view converges.

As illustrated in FIG. 11, in the optical system 10 in the present exemplary embodiment, the first optical unit L10 having positive power, the second optical unit L20 that includes the first diffraction element 50 and has positive power, the third optical unit L30 having positive power, and the fourth optical unit L40 that includes the second diffraction element 70 and has positive power are provided along an optical path of the image light emitted from the image light generating device 31.

In the optical system 10 in the present exemplary embodiment, a first intermediate image P1 of the image light is formed between the first optical unit L10 and the third optical unit L30, a pupil R1 is formed between the second optical unit L20 and the fourth optical unit L40, a second intermediate image P2 of the image light is formed between the third optical unit L30 and the fourth optical unit L40, and the fourth optical unit L40 collimates the image light to form an exit pupil R2. At this time, the third optical unit L30 causes the main light beam at the angle of view of the image light emitted from the second optical unit L20 to be incident on the fourth optical unit L40 as divergent light.

In the optical system 10 in the present exemplary embodiment, the pupil R1 is formed between the second optical unit L20 and the third optical unit L30 between the second optical unit L20 and the fourth optical unit L40.

Therefore, according to the optical system 10 in the present exemplary embodiment, the first intermediate image P1 of the image light is formed between the projection optical system 32 and the light-guiding system 60, the pupil R1 is formed near the light-guiding system 60, the second intermediate image P2 of the image light is formed between the light-guiding system 60 and the second diffraction element 70, and the second diffraction element 70 collimates the image light to form the exit pupil R2.

In the optical system 10 in the present exemplary embodiment, the first intermediate image P1 is formed between the first optical unit L10 (projection optical system 32) and the second optical unit L20 (first diffraction element 50).

According to the optical system 10 in the present exemplary embodiment, three conditions (Conditions 1, 2, and 3) described below are satisfied.

Condition 1: A light beam emitted from one point of the image light generating device 31 forms an image as one point in the retina E0.

Condition 2: An incident pupil of the optical system and a pupil of an eye are conjugated.

Condition 3: A peripheral wavelength is compensated between the first diffraction element 50 and the second diffraction element 70.

More specifically, as clearly seen from the dot-and-dash line Lb illustrated in FIG. 11, the light beam emitted from one point of the image light generating device 31 satisfies Condition 1 that an image is formed as one point in the retina E0, and thus the observer can visually recognize one pixel. Further, as clearly seen from the solid line La illustrated in FIG. 11, Condition 2 that the incident pupil of the optical system 10 and the pupil E1 of the eye E are conjugated (conjugation of the pupil) is satisfied, and thus the entire region of the image generated by the image light generating device 31 can be visually recognized. Further, as described above, Condition 3 that the peripheral wavelength of the image light L0 is compensated between the first diffraction element 50 and the second diffraction element 70 is satisfied by providing the correction optical system 45, and thus a color aberration generated by the second diffraction element 70 can be canceled.

Second Exemplary Embodiment

Next, a display device according to a second exemplary embodiment will be described. The case in which the correction optical system corrects the image light such that light having the specific wavelength, the light on the short wavelength side, and the light on the long wavelength side are incident on one point on the second diffraction element 70 in the optical system in the above-described exemplary embodiment is described. In the present exemplary embodiment, a case in which incident positions of light having a specific wavelength, light on a short wavelength side, and light on a long wavelength side are slightly different on a second diffraction element 70 is described.

Figure 12:
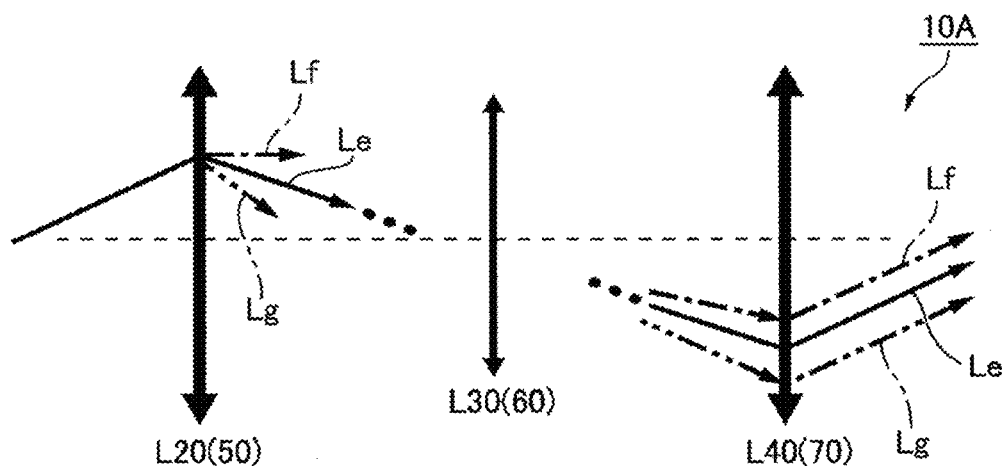
FIG. 12 is a light beam diagram between a first diffraction element and a second diffraction element in an optical system in a second exemplary embodiment.
Figure 13:
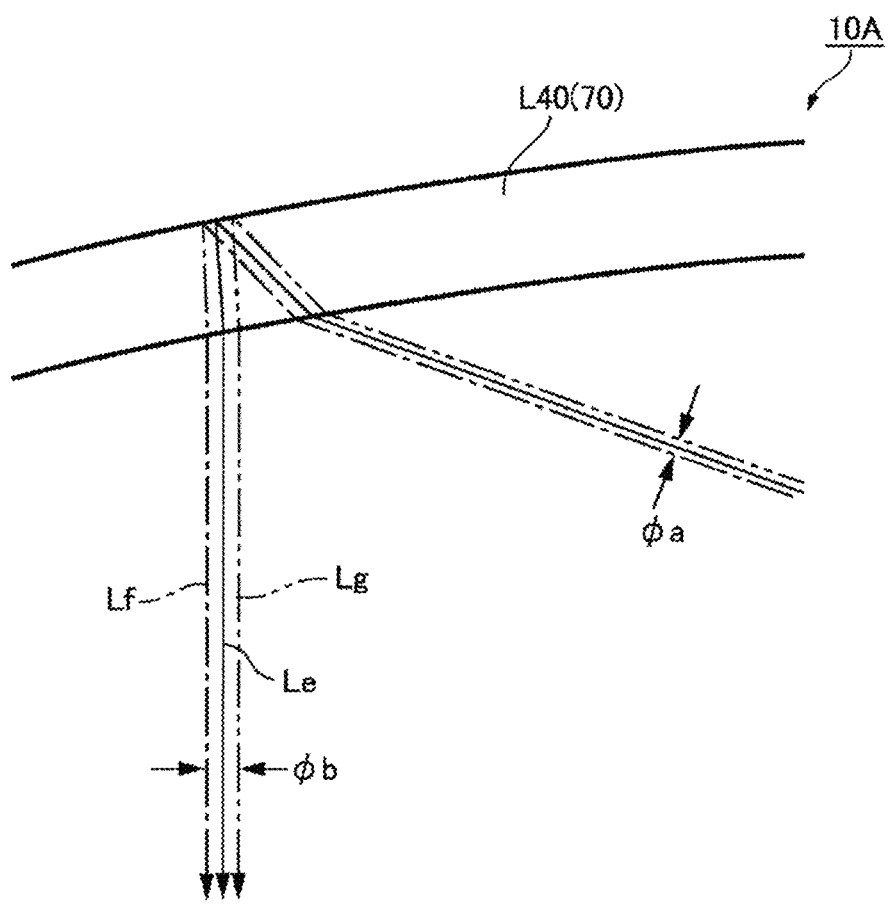
FIG. 13 is a schematic diagram of light emitted from the second diffraction element.
Figure 14:
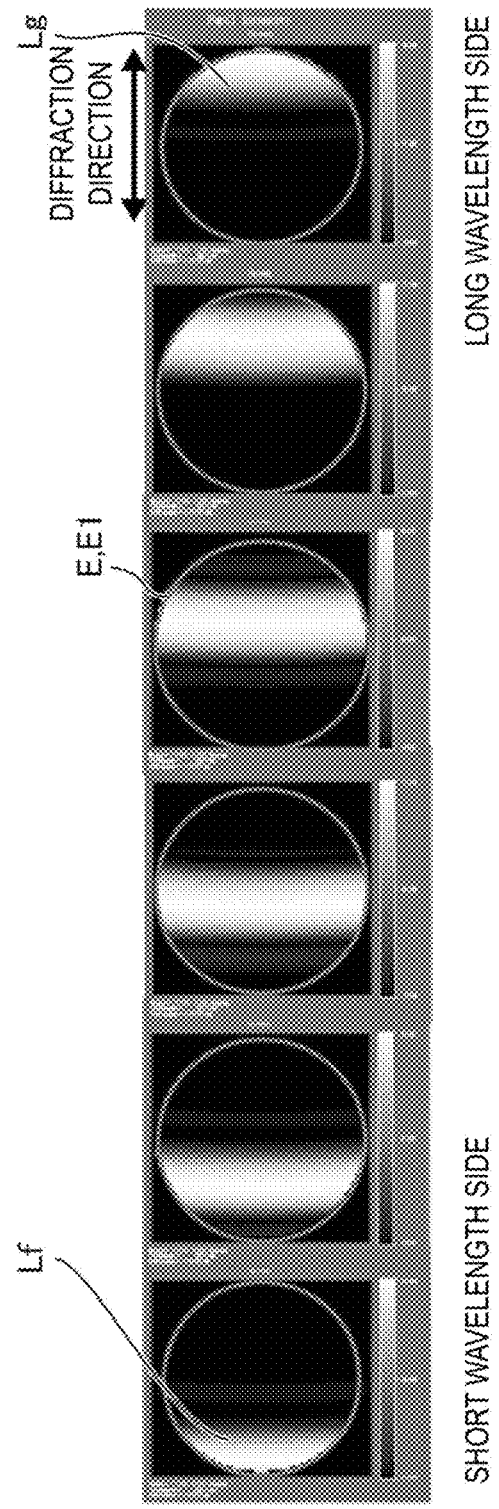
FIG. 14 is a schematic diagram illustrating a state in which the light illustrated in FIG. 13 is incident on an eye.

FIG. 12 is a light beam diagram between a first diffraction element 50 and the second diffraction element 70 in an optical system 10A in the present exemplary embodiment. FIG. 13 is a schematic diagram of light emitted from the second diffraction element 70. FIG. 14 is a schematic diagram illustrating a state in which the light illustrated in FIG. 13 is incident on an eye E. Note that, in FIG. 12, light having a specific wavelength is indicated by a solid line Le, light having a specific wavelength of −10 nm is indicated by a dot-and-dash line Lf, and light having a specific wavelength of +10 nm is indicated by a two-dot chain line Lg. FIG. 14 illustrates a state in which the light having the specific wavelength of −10 nm (light indicated by the dot-and-dash line Lf in FIG. 13) is incident on the eye E on the farthest left side toward the drawing. FIG. 14 illustrates a state in which the light having the specific wavelength of +10 nm (light indicated by the two-dot chain line Lg in FIG. 13) is incident on the eye E on the farthest right side toward the drawing. FIG. 14 illustrates a state in which light having a wavelength changed from the specific wavelength of −10 nm to the specific wavelength of +10 nm is incident on the eye E between the farthest left side and the farthest right side. Note that FIG. 14 does not illustrate a state in which the light having the specific wavelength is incident on the eye E, but the state in which the light having the specific wavelength is incident on the eye E is an intermediate state between a third illustrated state from the left and a fourth illustrated state from the left.

In this case, as illustrated in FIG. 13, light having a peripheral wavelength deviated from the specific wavelength varies in a state in which the light is incident on the second diffraction element 70. Here, in the second diffraction element 70, the number of interference fringes decreases and the light bending force is weaker as the optical axis is located closer. Thus, the light having the specific wavelength and the light having the peripheral wavelength are collimated in a case in which the light on the long wavelength side is incident on the optical axis side and the light on the short wavelength side is incident on the end, and thus an effect similar to wavelength compensation can be acquired.

In this case, a light beam position is deviated by a wavelength as illustrated in FIG. 13, and thus a light beam diameter incident on the pupil increases from a diameter φa to a diameter φb. FIG. 14 illustrates a state of intensity of the light beam incident on the pupil at that time. As clearly seen from FIG. 14, the pupil cannot be filled near the specific wavelength, but the light having the peripheral wavelength can fill the pupil diameter since the light having the peripheral wavelength is incident on a position deviated from that of the light having the specific wavelength. As a result, the observer can acquire advantages such as easy viewing of an image.

Modification Example

Figure 15:
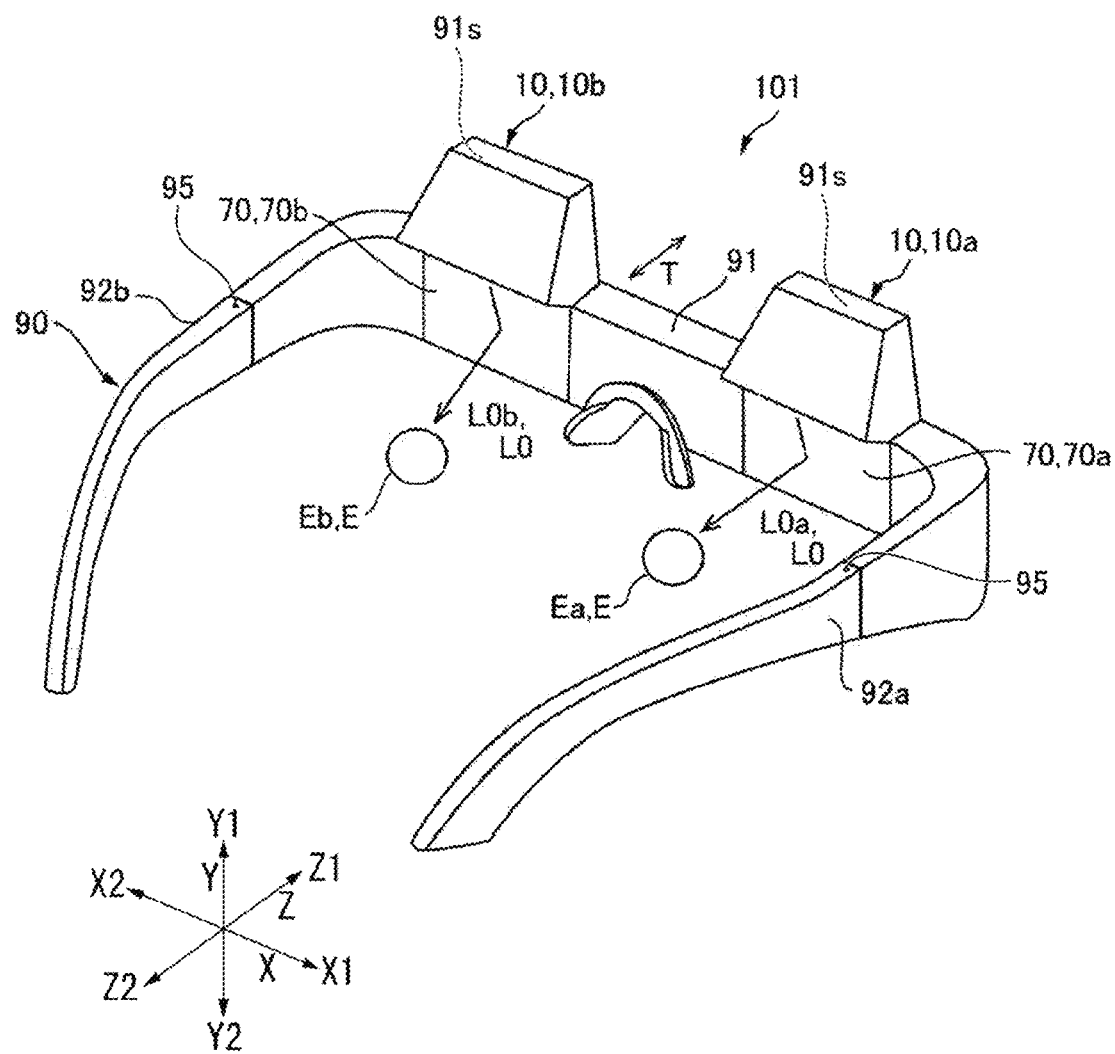
FIG. 15 is a configuration diagram of a display device according to a modification example.

FIG. 15 is a configuration diagram of a display device 101 according to a modification example. As illustrated in FIG. 15, the display device 101 in the modification example includes a right-eye optical system 10a that causes image light L0a to be incident on a right eye Ea, a left-eye optical system 10b that causes image light L0b to be incident on a left eye Eb, and a frame 90 that holds the right-eye optical system 10a and the left-eye optical system 10b.

The display device 101 in the present modification example has a configuration in which the image light L0 travels from the upper side Y1 to the lower side Y2 in the right-eye optical system 10a and the left-eye optical system 10b, and is thus emitted to an eye E of an observer.

The display device 101 in the present modification example also includes the above-described optical system 10. Thus, the display device 101 in the present modification example can also achieve the side reduction of the device while appropriately performing wavelength compensation by two diffraction elements.

Hereinbefore, the exemplary embodiment according to the display device of the present disclosure is described, but the present disclosure is not limited to the above exemplary embodiment, and is appropriately changeable without departing from the gist of the disclosure.

For example, in the exemplary embodiments described above, an example is given of the case in which the second diffraction angle of the image light L0 at the second diffraction element 70 is greater than the first diffraction angle of the image light L0 at the first diffraction element 50. However, the present disclosure is not limited to this example. In other words, in the present disclosure, it is sufficient that the second diffraction angle of the second diffraction element 70 and the first diffraction angle of the first diffraction element 50 are different from each other, and the first diffraction angle may be greater than the second diffraction angle. In this way, even when the first diffraction angle is greater than the second diffraction angle, by providing the correction optical system, the size reduction of the display device can be achieved while appropriately performing wavelength compensation by the two diffraction elements.

Further, in the exemplary embodiments described above, an example is given of the case in which the correction optical system 45 is provided integrally with the first diffraction element 50 of the second optical unit L20. However, a place where the correction optical system 45 is provided is not limited to this example. For example, the correction optical system 45 may be provided on a part of a plurality of lenses constituting the projection optical system 32.

Further, an example is given of the case in which the prism 45a constituting the correction optical system 45 in the exemplary embodiments described above has all the functions of the correction optical systems 45A to 45C illustrated in FIGS. 9A to 9C. However, the correction optical system of the present disclosure is not limited to this example. It is sufficient that the prism 45a includes at least one function of the correction optical systems 45A to 45C described above.

Application to Other Display Device

In the exemplary embodiments described above, the head-mounted display device 100 is exemplified, but the present disclosure may be applied to a head-up display, a handheld display, a projector optical system, and the like.

What is claimed is:

1. A display device, comprising:
along an optical path of image light emitted from an image light generating device,
a first optical unit;
a second optical unit that includes:

a first diffraction element; and
a correction optical system provided along the first diffraction element;
a third optical unit; and
a fourth optical unit that includes a second diffraction element, wherein:
a first diffraction angle of the image light at the first diffraction element is different from a second diffraction angle of the image light at the second diffraction element,
the correction optical system corrects an incident angle of the image light with respect to the second diffraction element,
the correction optical system has a light incident/emission surface on which the image light from the first optical unit is incident and which the image light diffracted by the first diffraction element emits toward the third optical unit, and
the correction optical system includes:
a first side closer to the second diffraction element, and
a second side closer to the image light generating device such that a thickness of the second side is thinner than a thickness of the first side.

2. The display device according to claim 1, wherein the second diffraction angle is greater than the first diffraction angle.

3. The display device according to claim 1, wherein the correction optical system deflects the image light dispersed by the first diffraction element.

4. The display device according to claim 1, wherein the correction optical system changes an incident angle of the image light with respect to the first diffraction element.

5. The display device according to claim 1, wherein the correction optical system changes an incident position of the image light with respect to the first diffraction element.

6. The display device according to claim 1, wherein the correction optical system includes a prism.

7. The display device according to claim 1, wherein the correction optical system is structured to correct an emission angle of the image light dispersed at each wavelength such that light having a specific wavelength and light having a peripheral wavelength are substantially parallel when being emitted from the second diffraction element.

8. The display device according to claim 1, wherein the correction optical system is integrally provided with the first diffraction element of the second optical unit.

9. The display device according to claim 1, wherein the second optical unit and the correction optical system are spaced from the third optical unit, and the third optical unit directly receives the image light emitted from the light incident/emission surface of the correction optical system.

10. The display device according to claim 1, wherein the correction optical system is directly attached to the first diffraction element of the second optical unit.

* * * * *